United States Patent
Wang

(10) Patent No.: US 8,423,600 B2
(45) Date of Patent: Apr. 16, 2013

(54) ACCUMULATING OPERATOR AND ACCUMULATING METHOD FOR FLOATING POINT OPERATION

(75) Inventor: Ko-Fang Wang, Taipei (TW)

(73) Assignee: Via Technologies, Inc., Shindian, Taipei (TW)

( * ) Notice: Subject to any disclaimer, the term of this patent is extended or adjusted under 35 U.S.C. 154(b) by 2190 days.

(21) Appl. No.: 11/032,486

(22) Filed: Jan. 10, 2005

(65) Prior Publication Data

US 2005/0177610 A1    Aug. 11, 2005

(30) Foreign Application Priority Data

Feb. 11, 2004   (TW) ............................ 93103230 A

(51) Int. Cl.
G06F 7/42     (2006.01)
G06F 7/38     (2006.01)

(52) U.S. Cl.
USPC ........................................ 708/505; 708/501

(58) Field of Classification Search .............. 708/490, 708/523, 495, 670, 501, 505
See application file for complete search history.

(56) References Cited

U.S. PATENT DOCUMENTS

| | | | | |
|---|---|---|---|---|
| 5,060,182 A * | 10/1991 | Briggs et al. | ... | 708/605 |
| 5,159,566 A * | 10/1992 | Briggs et al. | ... | 708/605 |
| 5,629,884 A * | 5/1997 | Pan et al. | ... | 708/517 |
| 5,951,625 A * | 9/1999 | Duvanenko et al. | ... | 708/290 |
| 6,567,831 B1* | 5/2003 | Loginov | ... | 708/290 |
| 6,711,596 B1* | 3/2004 | Coleman | ... | 708/277 |
| 2001/0025292 A1* | 9/2001 | Denk et al. | ... | 708/550 |
| 2002/0169813 A1* | 11/2002 | Pechanek et al. | ... | 708/622 |
| 2003/0037080 A1* | 2/2003 | Clifton | ... | 708/270 |
| 2004/0059768 A1* | 3/2004 | Denk et al. | ... | 708/497 |

* cited by examiner

Primary Examiner — Chuong D Ngo
(74) Attorney, Agent, or Firm — Evan R. Witt; Kirton McConkie

(57) ABSTRACT

An accumulating operator is applicable to a digital data processor to realize an output floating point number in response to a first floating point number and a second floating point number. The accumulating operator comprises a splitter dividing the first floating point number into a third floating point number and a compensation number, wherein an exponent of the third floating point number is equal to or greater than the exponent of the second floating point number; an accumulator electrically connected to the splitter for operating the second and third floating point numbers to realize a fourth floating point number; and a compensator electrically connected to the splitter and the accumulator for operating the fourth floating point number and the compensation number to realize the output floating point number. Via compensation, the precision of the floating point operation can be improved.

14 Claims, 2 Drawing Sheets

ACCUMULATING OPERATOR AND ACCUMULATING METHOD FOR FLOATING POINT OPERATION

FIELD OF THE INVENTION

The present invention relates to an accumulating operator, and more particularly to an accumulating operator for use in a digital processor to operate floating points. The present invention also relates to an accumulating method for floating point operation.

BACKGROUND OF THE INVENTION

In a digital processor such as a graphics processing unit of a computer system, multiply-adders are commonly used to implement the calculation of, for example, a plane equation O=A+Adx*DX+Ady*DY, where O, A, Adx and Ady are floating points, DX and DY are integers, and the resulting value O repeatedly replaces the value A in subsequent operations to obtain new values O. Thus, it can be realized that $A[1]=A[0]+Adx*DX[0]+Ady*DY[0]$;

$A[2]=A[1]+Adx*DX[1]+Ady*DY[1]$;

$A[n]=A[n-1]+Adx*DX[n-1]+Ady*DY[n-1]$, where n is a natural number.

Please refer to FIG. 1 that a block functional block diagram illustrating a conventional accumulating operator for operating the plane equation A[n]=A[n−1]+Adx*DX[n−1]+Ady*DY[n−1]. By this accumulator, a series of output values A[n] can be obtained with floating points A[0], Adx and Ady and input integers DX[0] and DY[0] inputted from the external. The floating point A[0] selected via a multiplexer 11 is first transferred to a register 12, and subsequently operated in an adder 103 of a multiply-adder 10 with the floating points Adx and Ady which have been operated in multipliers 101 and 102 of the multiply-adder 10, respectively, to obtain an output floating point A[1]. The output floating point A[1] then substitutes for the previously inputted floating point A[0] to be operated with input integers DX[1] and DY[1] in the multiply-adder 10 to obtain an output floating point A[2]. Likewise, the output floating point A[2] and integers DX[2] and DY[2] are inputted to obtain an output floating point A[3]. In this manner, a series of output floating points A[1], A[2], A[3], . . . , can be obtained.

Typical floating point notation used in a computer system is based on a binary system. For example, the floating point notation of a value 18.75 in a decimal system is $(10010.11)_2$ in the binary system, or expressed as $1.00101*2^4$. After normalization, the single precision floating point is recorded as the following in a storage media:

| 0 | 10000011 | 00101100000000000000000 |
|---|----------|-------------------------| wherein the bit in the first column indicates the sign, i.e. "0" for positive or "1" for negative; the bit combination in the second column indicates the biased exponent "4" on the condition that (01111111) represents "0"; and the bit combination in the third column indicates the mantissa.

When executing addition operation, members of the additive group is required to have the same base and exponent. In other words, the bit combinations in the second columns of these members should be identical. Accordingly, for executing addition operation, one or more normalized values may need to be transformed so as to unify the exponent. Giving the expression "18.75+1.25" in the decimal system as an example, it will become "$1.001011*2^4+1.01*2^0$" in the computer system. For unifying the exponent, "$1.001011*2^4+1.01*2^0$" expressed as "$1.00101100000000000000000*2^{10000011\text{-}01111111}+1.01000000000000000000000*2^{01111111\text{-}01111111}$" is transformed into "$1.00101100000000000000000*2^{10000011\text{-}01111111}+0.00010100000000000000000*2^{10000011\text{-}01111111}$", which is thus equal to "$1.01000000000000000000000*2^{10000011\text{-}01111111}$". The operations are recorded as the following codes:

| 0 | 10000011 | 00101100000000000000000 | + |
|---|----------|-------------------------|---|
| 0 | 01111111 | 01000000000000000000000 | = |
| 0 | 10000011 | 00101100000000000000000 | + |
| 0 | 10000011 | 00010100000000000000000 | = |
| 0 | 10000011 | 01000000000000000000000 | . |

It is apparent from the above operations that if it is the small-value one to be transformed by biasing the exponent and shifting the mantissa backwards, the transformed value might become distorted because of the shift of the mantissa partly out of the range. This problem is particularly serious when the exponents differ a lot or the operations are repeatedly executed as in the multiply-adder 13 of FIG. 1.

The use of a multiply-adder of improved precision may solve this problem to a certain extent. An increased number of operating units and an enlarged size of memory, however, are required to achieve the high precision. Thus it will be cost-ineffective.

SUMMARY OF THE INVENTION

Therefore, the present invention provides an accumulating operator which is capable of precisely operating floating points with limited hardware requirement.

The present invention relates to an accumulating operator for use in a digital data processor to realize an output floating point number in response to a first floating point number and a second floating point number. The accumulating operator comprises a splitter dividing the first floating point number into a third floating point number and a compensation number, wherein an exponent of the third floating point number is equal to the exponent of the second floating point number; an accumulator electrically connected to the splitter for operating the second and third floating point numbers to realize a fourth floating point number; and a compensator electrically connected to the splitter and the accumulator for operating the fourth floating point number and the compensation number to realize the output floating point number.

In an embodiment, a sum of the third floating point number and the compensation number is equal to the first floating point number, the second and third floating point numbers execute an addition operation in the accumulator, and the fourth floating point number and the compensation number execute an addition operation in the compensator.

In an embodiment, a subsequent cycle is performed by feeding the fourth floating point number back to the accumulator to replace the third floating point number to be operated with the second floating point number.

Preferably, the accumulating operator further comprises a multiplexer electrically connected to the splitter and the accumulator and controlled to select the third or fourth floating point number to be outputted to the accumulator.

Preferably, the accumulating operator further comprises a register electrically connected to the multiplexer and the accumulator for storing therein one of the third and fourth floating point numbers selected via the multiplexer.

In an embodiment, the accumulator comprises a multiplier for realizing the second floating point number in response to an input floating point number and an input integer; and an adder coupled to the register and the multiplexer for executing an addition operation of the floating point numbers stored in the register and the second floating point number.

When the present accumulating operator is used with a graphics processor, the accumulator may include a plurality of multipliers and adders.

In an embodiment, the compensator is a floating point adder.

The present invention also relates to an accumulating operator similar to the aforementioned accumulating operator wherein an exponent of the third floating point number is equal to or greater than the exponent of the second floating point number.

The present invention further relates to an accumulating method for realizing an output floating point number in response to a first floating point number and a second floating point number. The method comprises steps of: splitting the first floating point number into a third floating point number and a compensation number, wherein an exponent of the third floating point number is equal to or greater than the exponent of the second floating point number, and a sum of the third floating point number and the compensation number is equal to the first floating point number; performing an addition operation of the second and third floating point numbers to realize a fourth floating point number in a first operating cycle; and performing an addition operation of the fourth floating point number and the compensation number to realize the output floating point number.

In an embodiment, the accumulating method further comprises a step of replacing the fourth floating point number for the third floating point number to perform an addition operation with the second floating point number in a second operating cycle subsequent to the first operating cycle.

In an embodiment, the accumulating method further comprises a step of selecting one of the third and fourth floating point numbers to perform an addition operation with the second floating point number in a second operating cycle subsequent to the first operating cycle.

The accumulating method according to the present invention is applicable to operate a plane equation in a graphics processor. In an embodiment, the accumulating operator further comprises a step of performing a plurality of multiplication operations of input floating point numbers with corresponding input integers to realize a plurality of floating point numbers including the second floating point number.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
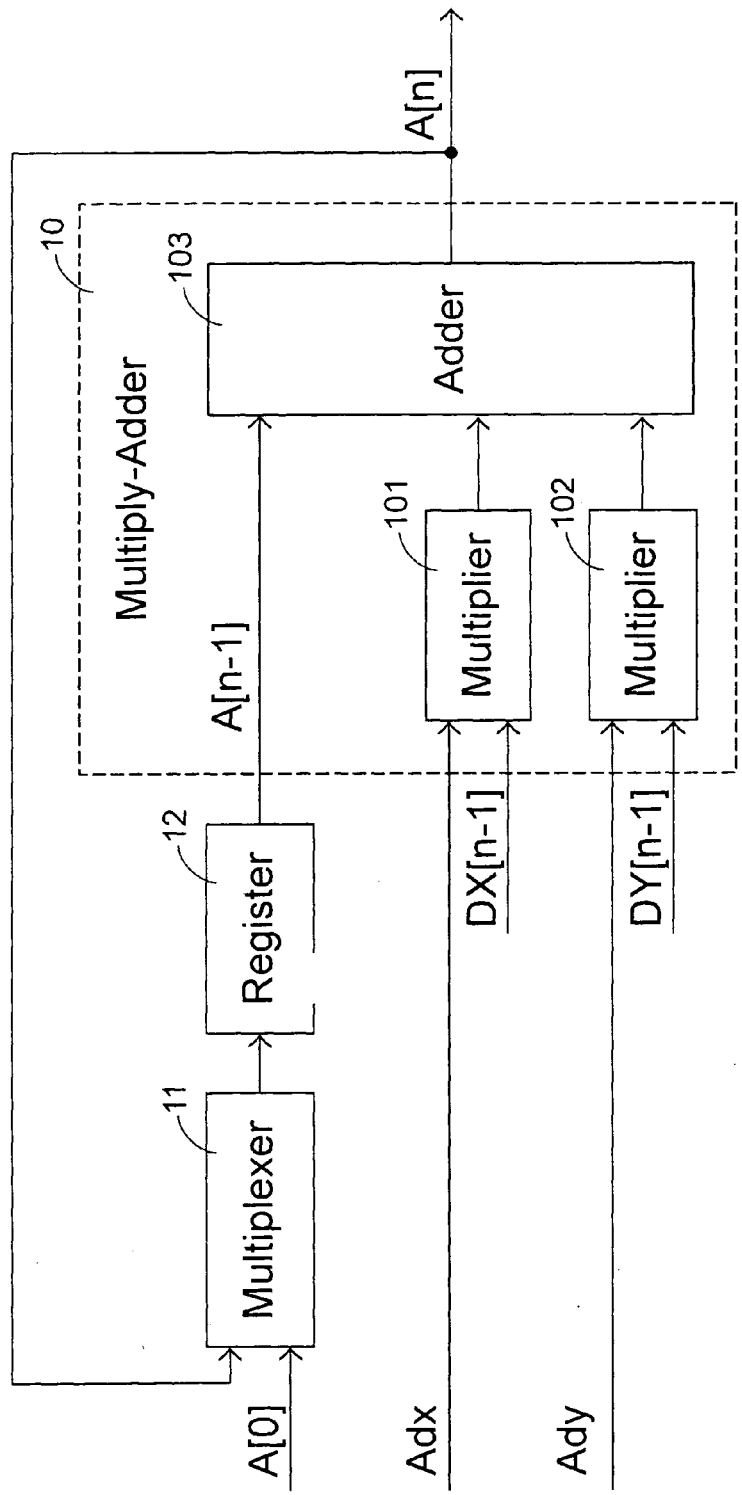
FIG. 1 is a block functional block diagram illustrating a conventional accumulating operator for floating point operation.
Figure 2:
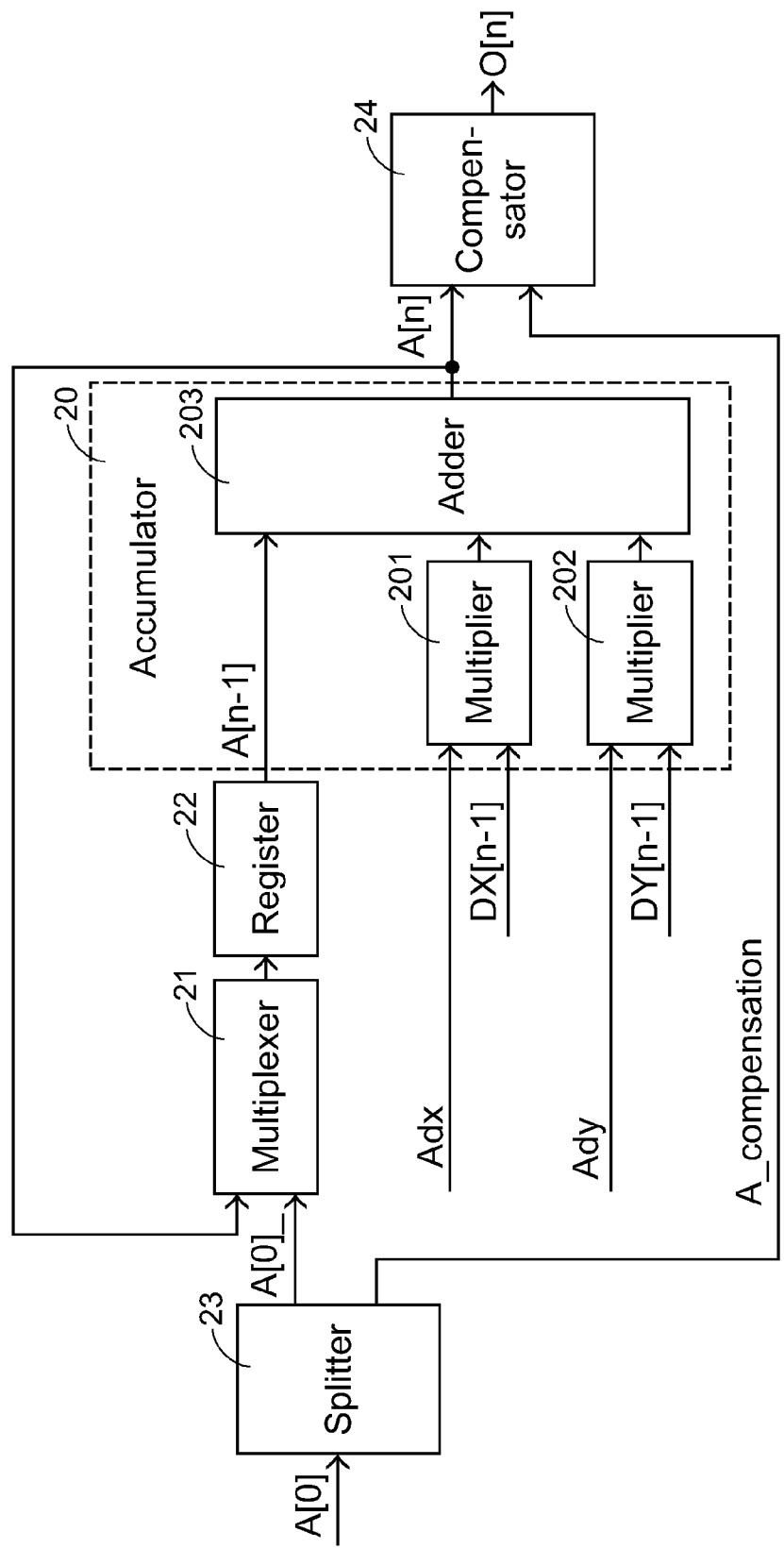
FIG. 2 is a block functional block diagram illustrating an accumulating operator for floating point operation according to an embodiment of the present invention.

Please refer to FIG. 2 which schematically shows an embodiment of an accumulating operator for floating point operation, e.g. the plane equation $A[n]=A[n-1]+Adx*DX[n-1]+Ady*DY[n-1]$, according to the present invention. The accumulating operator comprises an accumulator 20, a multiplexer 21, a register 22, a splitter 23 and a compensator 24. The accumulator 20 further comprises of multipliers 201 and 202 and an adder 203. The floating points A[0], Adx and Ady and input integers DX[0] and DY[0] are inputted from the external. First of all, the floating point A[0] is split into a floating point number A[0]_ and a compensation number A_compensation by the splitter 23. The floating point number A[0]_ selected via the multiplexer 21 is transferred to the register 22, and subsequently operated in the adder 203 of the accumulator 20 with the floating points Adx and Ady which have been operated in the multipliers 201 and 202 of the accumulator 20, respectively, to obtain an output floating point A[1]. Since a compensation number A_compensation is previously extracted from the floating point A[0], the output floating point A[1] is adjusted with the compensation number A_compensation to result in a compensated output floating point O[1]. The output floating point A[1] then substitutes for the previously inputted floating point A[0] and selected via the multiplexer 21 to be operated with input integers DX[1] and DY[1] in the accumulator 20 to obtain an output floating point A[2]. Likewise, the output floating point A[1] is adjusted with a compensation number A_compensation previously extracted from the output floating point A[1] to result in a compensated output floating point O[2]. Subsequently, the output floating point A[2] and integers DX[2] and DY[2] are inputted to obtain an output floating point A[3] and thus compensated output floating point O[3]. In this manner, a series of compensated output floating points O[1], O[2], O[3], . . . , can be obtained.

How the compensation mentioned above improves the precision of the floating point operation will be described hereinafter with reference to the following example.

In this example, the floating point operation equivalent to the operation "18.75+1.25" in the decimal system is performed. Accordingly, A[0]=18.75 and is split into A[0]_=2.75 and A_compensation=16. The floating point notations in the binary system are:

| 0 | 10000011 | 00101100000000000000000 | = |
| 0 | 10000011 | 00000000000000000000000 | + |
| 0 | 10000000 | 01100000000000000000000 | |

Accordingly, 18.75+1.25 can be converted into (16+2.75)+1.25, which IS alternatively expressed as 16+(2.75+1.25). The equation 18.75+1.25=(16+2.75)+1.25=16+(2.75+1.25) in the decimal system is expressed as $$\text{``}1.00101100000000000000000\text{''} * 2^{10000011-01111111} +$$
$$1.01000000000000000000000 * 2^{01111111-01111111}\text{''} =$$
$$\text{``}1.00000000000000000000000\text{''} * 2^{10000011-01111111} +$$
$$1.01100000000000000000000 * 2^{10000000-01111111} +$$
$$\text{``}1.01000000000000000000000\text{''} * 2^{01111111-01111111}\text{''} =$$
$$\text{``}1.00000000000000000000000\text{''} * 2^{10000011-01111111} +$$
$$1.01100000000000000000000 * 2^{10000000-01111111} +$$
$$\text{``}0.10100000000000000000000\text{''} * 2^{10000000-01111111}\text{''} =$$
$$\text{``}1.00101100000000000000000\text{''} * 2^{10000011-01111111} +$$
$$1.00000000000000000000000 * 2^{10000001-01111111}\text{''} =$$
$$\text{``}1.00101100000000000000000\text{''} * 2^{10000011-01111111} +$$
$$0.01000000000000000000000 * 2^{10000001-01111111}\text{''} =$$
$$\text{``}1.01000000000000000000000\text{''} * 2^{10000011-01111111}\text{''}$$

in the computer system. The operations are recorded as the following codes:

| 0 | 10000011 | 00101100000000000000000 | + |
| 0 | 01111111 | 01000000000000000000000 | = |
| 0 | 10000011 | 00000000000000000000000 | + |
| 0 | 10000000 | 01100000000000000000000 | + |
| 0 | 01111111 | 01000000000000000000000 | = |
| 0 | 10000011 | 00000000000000000000000 | + |
| 0 | 10000000 | 01100000000000000000000 | + |
| 0 | 10000000 | 10100000000000000000000 | = |
| 0 | 100000011 | 00000000000000000000000 | + |
| 0 | 100000001 | 00000000000000000000000 | = |
| 0 | 100000011 | 00000000000000000000000 | + |
| 0 | 100000011 | 01000000000000000000000 | = |
| 0 | 100000011 | 01000000000000000000000 | . |

From the above equation, it is understood that by adjusting the exponent of the floating point number A[0]_ to a value equal to or slightly greater then the exponent of the other members of the additive group, i.e. Adx and Ady. The occurrence of partly omission of the mantissa during the floating point operation A[1]=A[0]+Adx*DX[0]+Ady*DY[0] can be avoided to a great extent or completely eliminated, and so as the compensated output floating point O[0]. Since the compensation is performed for each output floating point, the partly omission of the mantissa, even if still occurs occasionally, will not result in serious distortion of the resulting floating point. According to the present invention, precise operation of the floating points can be accomplished without increasing operating units or enlarging memory size.

It is to be noted that the accumulator 20 in the above embodiment is exemplified to include one adder 203 and two multipliers 201 and 202 for operating the plane equation A[n]=A[n−1]+Adx*DX[n−1]+Ady*DY[n−1]. Nevertheless, depending on practice requirement, more adders or multipliers can be used to execute further operations.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An accumulating operator for use in a digital data processor to realize an output floating point number by operating a first floating point number and a second floating point number, said accumulating operator comprises:
   a splitter dividing said first floating point number into a third floating point number and a compensation number, wherein the value of the compensation number is an integer value less than the first floating point number and an exponent of said third floating point number is equal to the exponent of said second floating point number;
   an accumulator electrically connected to said splitter for operating said second and third floating point numbers to realize a fourth floating point number; and
   a compensator electrically connected to said splitter and said accumulator for operating said fourth floating point number and said compensation number to realize said output floating point number;
   wherein said first floating point number equals the sum of said third floating point number and said compensation number; said fourth floating point number equals the sum of said second floating point number and said third floating point number; and said output floating point number equals the sum of said fourth floating point number and said compensation number.

2. The accumulating operator according to claim 1 wherein said fourth floating point number is fed back to said accumulator to replace said third floating point number to be operated with said second floating point number.

3. The accumulating operator according to claim 2 further comprising a multiplexer electrically connected to said splitter and said accumulator and controlled to select said third or fourth floating point number to be outputted to said accumulator.

4. The accumulating operator according to claim 3 further comprising a register electrically connected to said multiplexer and said accumulator for storing therein one of said third and fourth floating point numbers selected via said multiplexer.

5. The accumulating operator according to claim 4 wherein said accumulator comprises:
   a multiplier for realizing said second floating point number in response to an input floating point number and an input integer; and
   an adder coupled to said register and said multiplexer for executing an addition operation of said floating point numbers stored in said register and said second floating point number.

6. The accumulating operator according to claim 5 wherein said digital data processor is a graphics processor and said accumulator includes at least one multiplier and at least one adder.

7. The accumulating operator according to claim 1 wherein said compensator is a floating point adder.

8. An accumulating operator for use in a digital data processor to realize an output floating point number by operating a first floating point number and a second floating point number, said accumulating operator comprises:

a splitter dividing said first floating point number into a third floating point number and a compensation number, wherein the value of the compensation number is an integer value less than the first floating point number and an exponent of said third floating point number is equal to or greater than the exponent of said second floating point number;

an accumulator electrically connected to said splitter for operating said second and third floating point numbers to realize a fourth floating point number; and a compensator electrically connected to said splitter and said accumulator for operating said fourth floating point number and said compensation number to realize said output floating point number;

wherein said first floating point number equals the sum of said third floating point number and said compensation number; said fourth floating point number equals the sum of said second floating point number and said third floating point number; and said output floating point number equals the sum of said fourth floating point number and said compensation number.

9. The accumulating operator according to claim 8 further comprising a multiplexer electrically connected to said splitter and said accumulator for receiving said third and fourth floating point numbers, and controlled to select said third or fourth floating point number to be outputted to said accumulator to be operated with said second floating point number.

10. An accumulating method performed by a digital data processor specifically programmed to implement said accumulating method to realize an output floating point number by operating a first floating point number and a second floating point number, said method comprising steps of:

splitting said first floating point number into a third floating point number and a compensation number, wherein the value of the compensation number is an integer value less than the first floating point number and an exponent of said third floating point number is equal to or greater than the exponent of said second floating point number, and a sum of said third floating point number and said compensation number is equal to said first floating point number;

adding said second and third floating point numbers to realize a fourth floating point number in a first operating cycle; and adding said fourth floating point number and said compensation number to realize said output floating point number.

11. The accumulating method according to claim 10 further comprising a step of replacing said fourth floating point number for said third floating point number to perform an addition operation with said second floating point number in a second operating cycle subsequent to said first operating cycle.

12. The accumulating method according to claim 10 further comprising a step of selecting one of said third and fourth floating point numbers to perform an addition operation with said second floating point number in a second operating cycle subsequent to said first operating cycle.

13. The accumulating method according to claim 12 wherein said digital data processor is used in a graphics processor to operate a plane equation and further comprising a step of performing a plurality of multiplication operations of input floating point numbers with corresponding input integers to realize a plurality of floating point numbers including said second floating point number.

14. The accumulating method according to claim 10 wherein said digital data processor is used in a graphics processor to operate a plane equation and further comprising a step of performing a plurality of multiplication operations of input floating point numbers with corresponding input integers to realize a plurality of floating point numbers including said second floating point number.

* * * * *